United States Patent [19]

Hartan

[11] Patent Number: 5,516,142
[45] Date of Patent: May 14, 1996

[54] BUGGY WITH A COLLAPSIBLE FRAME

[75] Inventor: Rolf Hartan, Sonnefeld-Gestungshausen, Germany

[73] Assignee: J. G. Hartan Kinderwagenwerk, Sonnefeld-Gestungshausen, Germany

[21] Appl. No.: 305,125

[22] Filed: Sep. 13, 1994

[30] Foreign Application Priority Data

Sep. 17, 1993 [DE] Germany .................. 9314000 U

[51] Int. Cl.⁶ .................................................. B62B 7/08
[52] U.S. Cl. .................. 280/642; 280/650; 280/655.1
[58] Field of Search .................. 280/642, 644, 280/647, 649, 650, 658, 47.38, 47.4, 655, 655.1; 16/115

[56] References Cited

U.S. PATENT DOCUMENTS

| | | | |
|---|---|---|---|
| 2,410,797 | 11/1946 | Allenbaugh | 280/642 |
| 2,490,189 | 12/1949 | Alexander | 280/655 |
| 3,796,439 | 3/1974 | Perego | 280/655.1 X |
| 4,448,434 | 5/1984 | Anderson | 280/655 X |
| 4,681,340 | 7/1987 | Pasquini | 280/642 |
| 4,741,551 | 5/1988 | Perego | 280/642 |
| 4,819,958 | 4/1989 | Perego | 280/658 X |
| 5,039,118 | 8/1991 | Huang | 280/642 X |
| 5,074,575 | 12/1991 | Bigo | 280/642 |
| 5,197,753 | 3/1993 | Liu | 280/642 |
| 5,209,509 | 5/1993 | Gay et al. | 280/304.1 |
| 5,249,438 | 10/1993 | Rhaney et al. | 280/655 X |
| 5,301,931 | 4/1994 | Bigo | 280/47.38 X |

FOREIGN PATENT DOCUMENTS

| | | | |
|---|---|---|---|
| 0256495 | 2/1988 | European Pat. Off. | 280/47.38 |
| 2334284 | 7/1974 | Germany | 280/642 |
| 0043239 | 4/1977 | Japan | 280/650 |

*Primary Examiner*—Brian L. Johnson
*Attorney, Agent, or Firm*—Jordan and Hamburg

[57] ABSTRACT

A buggy with a collapsible frame, comprising a sliding tube with a buggy handle, a buggy scissors part parallel to the sliding tube, a frame scissors part and a seat tube linked in an articulated fashion to the frame scissors part and the sliding tube, as well as a friction bearing, at which the ends of the frame scissors part is supported in an articulated fashion, the ends of the buggy scissors part is supported rigidly and the sliding tube is supported so that it can be shifted in a sliding fashion, and having a back rest, side armrests with a play frame and a pivotable footrest and spring-suspended wheels, which can be swiveled freely at least partly about a vertical axis as well as having essentially L-shaped buggy handles, which are parallel to one another in the normal driving position, wherein the buggy handles are mounted on the sliding tubes so that they can be pulled out in telescopic fashion and can be fixed by a locking sleeve in a plurality of pull-out positions.

19 Claims, 7 Drawing Sheets

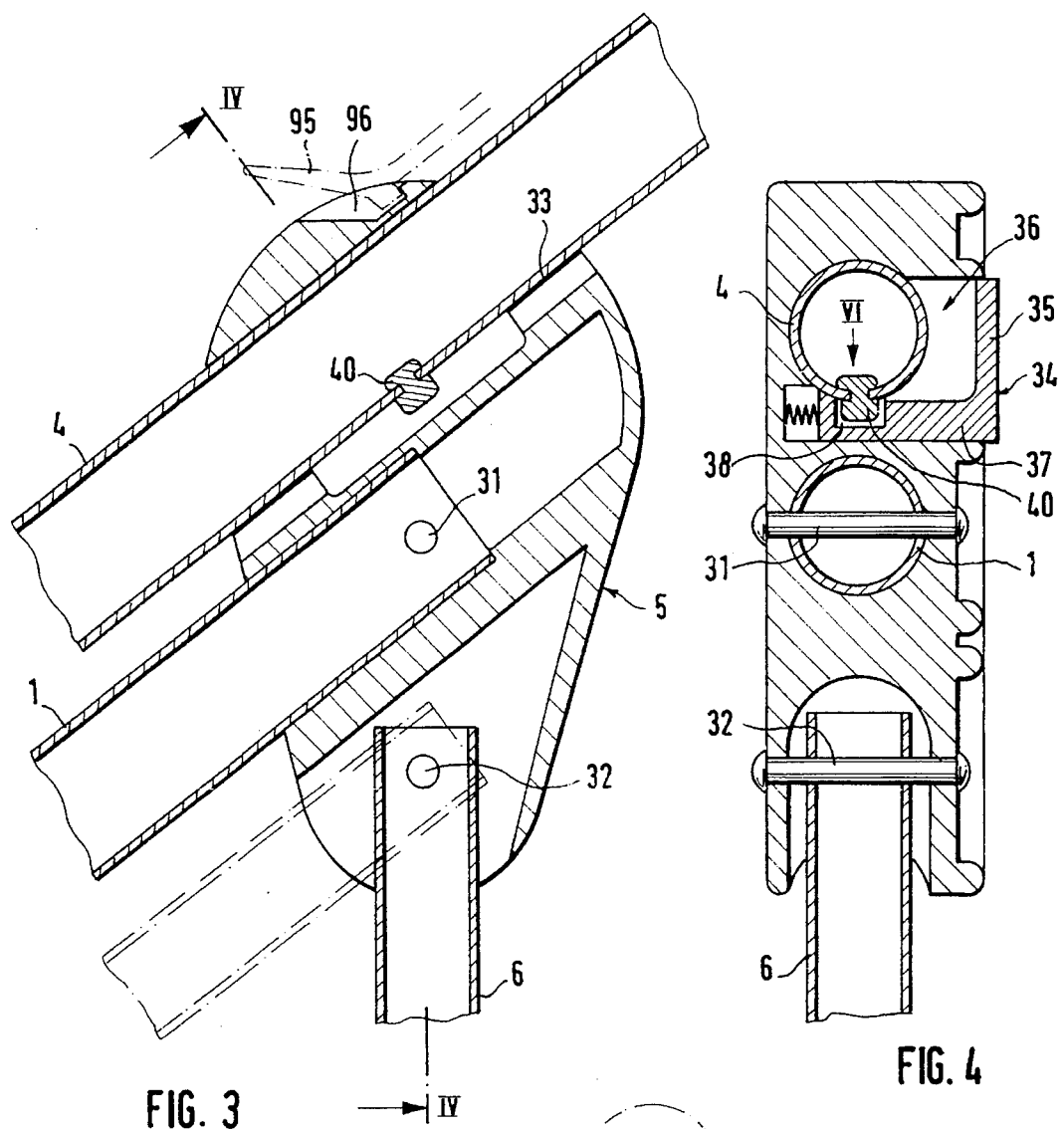

BUGGY WITH A COLLAPSIBLE FRAME

BACKGROUND OF THE INVENTION

The invention relates to a buggy with a collapsible frame, comprising a sliding tube with a buggy handle, a buggy scissors part parallel to the sliding tube, a frame scissors part and a seat tube linked in an articulated fashion to the frame scissors part and the sliding tube, as well as a friction bearing, at which the ends of the frame scissors part is supported in an articulated fashion, the ends of the buggy scissors part is supported rigidly and the sliding tube is supported so that it can be shifted in a sliding fashion, and having a back rest, side armrests with a play frame and a pivotable footrest and spring-suspended wheels, which can be swiveled freely at least partly about a vertical axis as well as having essentially L-shaped buggy handles, which are parallel to one another in the normal driving position.

Such carriages or carts, generally referred to on the market as "buggies", have already become known in various embodiments. A simple construction and a smooth-running operatability of the locking means, which furthermore should offer absolute reliability against accidental collapse, so that the chassis scissors cannot suddenly fold together during driving operation, is an essential requirement of such a collapsible buggy.

SUMMARY OF THE INVENTION

It is an object of the invention to develop a buggy of the initially-mentioned type in such a way, that it can be easily manufactured and is particularly user-friendly.

To accomplish this objective, provisions are made pursuant to a first distinguishing feature of the present invention that the buggy handles are mounted at the sliding tubes so that they can be pulled out in telescopic fashion, and can be fixed by means of a locking sleeve in a plurality of pull-out positions, in order to achieve an adaptation of the buggy handles to the size of the user in this manner.

In a further development of the invention, provisions can be made that the buggy handles can also be rotated inwards preferably in all pull-out positions in each case by 90° into a mutually aligned position, so that the buggy handles then act like parts of a normal, U-shaped buggy rod of a baby carriage. This position has advantages in some situations in handling the buggy in comparison to the otherwise customary, vertically upward directed position of the handles.

The above telescope-like adjustability of the length of the buggy handles, simultaneously in conjunction with the desired inward pivotability by 90°, can be achieved pursuant to the invention particularly easily owing to the fact that the tubular leg of the buggy handle, which is inserted with a sliding fit, is provided with at least two and preferably four rows of beads, which are mutually offset by 90° to one another and in which locking tongues of an inner sleeve fastened to the sliding tube, which locking tongues are provided with knobs, can be locked. The locking tongues are prevented from swiveling outwards and from making a telescopic adjustment possible by an overlapping unlocking sleeve, which is clamped by a spirally coiled spring in the locking position and can be shifted longitudinally on the inner sleeve.

Release is accomplished by shifting the unlocking sleeve against the action of the spirally coiled spring. The buggy handles can then be pulled, as desired, towards the inside and towards the outside, easily engaging each position of a bead, so that the respective locking position can be recognized immediately. As the unlocking sleeve is released, the buggy handles are then finally fixed automatically in the adjusted longitudinal position.

In a refinement of the invention, provisions can furthermore be made so that the outer unlocking sleeve has a stop shoulder, which in the locking position grasps behind a counter-shoulder of the inner sleeve. The stop shoulder and/or the counter-shoulder can be provided with forcing-in inclinations for assembling the sleeves simply by pressing them on one another.

In order to avoid direct guidance of the tubular leg of the buggy handle, which is inserted with a sliding fit in the sliding tube of the chassis, which is very difficult in practice because of unavoidable manufacturing tolerances under practical conditions and is undesirable because of frictional metal-to-metal contact, provisions can be made in a further development of the invention that the tubular leg of the buggy handle, which is inserted with a sliding fit, has an external diameter, which is smaller than the internal diameter of the sliding tube and is guided in the appropriately constricted section of the inner sleeve containing the locking tongues. A second guiding site is created advantageously owing to the fact that the tubular leg, inserted with a sliding fit, is provided at the inner end of the tube with a forced-in, sliding guidance stopper, which slides along the inner wall of the sliding tube.

It has proven to be particularly advantageous if a springy locking tongue, engaging a depression of the friction bearing when the frame is folded together, is integrally molded to the end of the inner sleeve remote from the buggy handle. The locking tongue then forms a locking device for the collapsed chassis, so that the latter cannot open up again by itself when handled, for example, while being kept at home or placed in the trunk of a car.

Pursuant to a further concept of the present invention to facilitate the handling of a collapsible buggy, provisions can be made so that the friction bearing has, in the region of the guiding borehole for the sliding tube, a recess for an essentially L-shaped raster knob, the leg of which, running under the sliding tube, has an angled longitudinal groove with a central latching indentation for a locking knob of the sliding tube, which preferably is constructed as a blind rivet, and so that the raster knob can be pressed in against a spring, so that the locking knob leaves the latching indentation and reaches a longitudinal groove, which enables the sliding tube to be shifted longitudinally relative to the friction bearing.

The friction bearing itself preferably is constructed essentially ovally, the sliding tube being guided in the upper, wider part and the frame scissors being linked to the lower narrower part.

The spring, which exerts a force on the raster knob towards the outside into its locking position, preferably is a spirally coiled spring, which engages an annular groove of the raster knob and is supported at the end of the guide for the lower leg of the raster knob.

For the so-called buggies under discussion in the present case, a play frame, connecting the armrests at the front, is of special importance. For putting in or taking out the child, it should be possible to swing this play frame out of the way quickly and easily or to remove it otherwise.

For this purpose, provisions are made pursuant to the present invention so that the armrests, preferably constructed as injection-molded plastic parts, are provided at the front end with recesses for the purpose of inserting the play frame in such a way that it can be removed easily. Advantageously, an elbow lever is mounted in the recess. The upper leg of this elbow lever engages a locking depression in the play frame, preventing the latter from being pulled out. The lower leg of this elbow lever, which is constructed as a release lever and grips the play frame from below, is held by a spring in the locking position.

The manipulation of this play frame locking system proves to be particularly simple and reliable if the lower leg lies hidden in the recess and can be gripped from below from the front for raising it against the action of the spring into the release position, so that, when the lower leg is lifted, the upper leg of the elbow lever is swiveled out of the locking depression of the play frame and the play frame can then simply be pulled out towards the front.

In order to re-attach it, the play frame is simply inserted into the recesses of the armrests. For this, the manipulation can be simplified even further owing to the fact that the upper leg of the elbow lever is provided with an insertion inclination for the play frame, so that, during the insertion, the elbow lever initially is swiveled against the spring opposite to the locking direction and then automatically back into the locking position, as soon as the locking depression lies under the cam of the upper leg of the elbow lever.

In this connection, it has furthermore proven to be advantageous to provide an insertion stop, which limits the elbow lever in the pivoting locking direction. Said insertion stop preferably is in the form of a stop, on which the lower leg of the elbow lever rests, so that the elbow lever can never be swiveled inward by the spring to such an extent, that the insertion of the play frame is blocked because the upper leg of the elbow lever protrudes too far into the recess of the armrest.

Previous buggies on the baby carriage market have the disadvantage that their dimensions cannot be adapted to the baby. For this reason, provisions are made according to a further distinguishing feature of the present invention so that the side legs of the footrest can be tilted sensitively in order to adjust their height over plastic joints acting on one side and are linked to the seat tubes, so that they can swivel back freely in the upward direction.

Contrary to previous embodiments, in which the footrest could be adjusted merely in the horizontal position and in the vertical, downward-hanging position, the inventive refinement makes possible a plurality of intermediate positions, in which the footrest is more or less at an angle for correspondingly supporting the lower leg in such inclined positions. On the other hand, the plastic joint, acting on one side, ensures that, when the chassis is collapsed, the footrests automatically can swivel into the horizontal position, that is, into the position, in which they are essentially aligned with the seat tubes, without any locking devices having to be unlocked for this purpose.

In a refinement of the invention, provisions are made so that the plastic joint has a crown gear, which can be pushed by means of a pushbutton against a spring from the engagement position in both joint shells, which are connected by an axle, completely into the first joint shell. The teeth of the crown gear are provided with inclinations which, by means of counter-inclinations at the teeth of the engagement recess of the second joint shell containing the pushbutton, form a ratchet-like free-wheeling in the pivoting direction upwards.

Aside from being able to change the inclination of the footrest, it is also possible to make provisions so that the length of the side legs of the footrest can be adjusted telescopically for the purpose of adapting it to the leg length of the child. Preferably, this can be accomplished owing to the fact that the inner tube of the side leg of the footrest contains a leaf spring with a locking bolt intended for engaging one of a plurality of longitudinally offset transverse recesses in the outer joint tube.

To achieve a cushioned drag bearing for the wheels with high load-carrying capability and good steerability, provisions are made in accordance with a further group of distinguishing features of the present invention so that the wheel suspension has an outer bearing sleeve with a lower shoulder for the one-sided offset coupling of a bearing box for the wheels, which outer bearing sleeve can be rotated about a vertical tube of the frame, preferably over an inner bearing sleeve and can optionally be locked and which is braced over a tension spring running obliquely downward against a second shoulder of the outer bearing sleeve, the point of engagement of which tension spring lies on the bearing box offset below the wheel axis. The very strong one-sided coupling and the offsetting of the linkage points results, on the one hand, in a relatively soft resiliency having a large spring excursion and furthermore, on the other, due to the offsetting of the point of engagement of the tension spring relative to the axle, in the advantage that a vertical displacement takes place already when an obstacle is struck. With that, the resiliency can also absorb such horizontal impacts with obstacles.

Finally, it is also within the scope of the invention to provide the inner bearing sleeve, which is placed on the tube so it cannot be rotated or shifted, with a collar with a lower locking recess, which can be engaged by a extension of a locking ring, which, in turn, can be shifted but not rotated on the outer bearing sleeve. Rotation can be prevented by a groove-spring guiding system. Preferably, the locking ring is provided with a lever, which protrudes to the outside and facilitates its actuation.

Further advantages, distinguishing features and details of the invention arise out of the following description of some embodiments, as well as out of the accompanying drawings

BRIEF DESCRIPTION OF THE DRAWINGS

FIG. 3 shows an enlarged section through the friction bearing, FIG. 4 shows an angled section along the line IV—IV of FIG. 3, FIG. 5 shows a view of the raster knob, not in section, corresponding to the representation above in FIG. 4, FIG. 6 shows a plan view of the lower leg of the raster knob in the direction of the arrow VI of FIG. 4.

DESCRIPTION OF THE PREFERRED EMBODIMENTS

Figure 1:
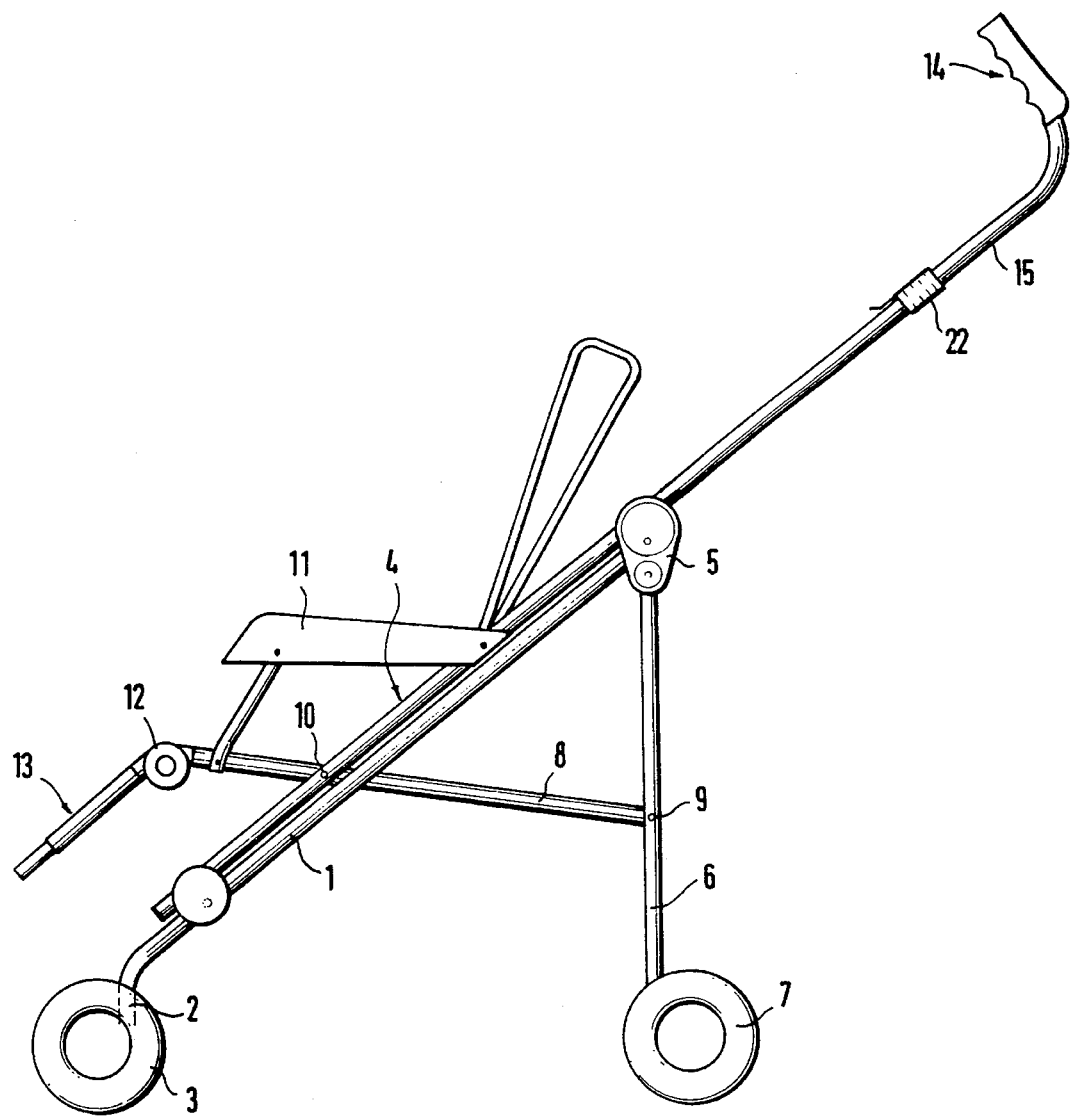
FIG. 1 shows a diagrammatic side view of the frame of an inventive, collapsible buggy.

FIG. 1 shows a diagrammatic view of the tubular frame of an inventive buggy with the buggy scissors part 1, to the vertical, angled-downwards tube section 2 of which one of the front wheels 3 is suspended springably and rotatably about a vertical axle, of a sliding tube 4, which is parallel to the buggy scissors part and can be shifted in the longitudinal direction relative to this part and is guided so that it can be displaced longitudinally and locked in a friction bearing 5, in which the buggy scissors part is also held, of a frame scissors 6, at the lower tubular section of which the rear wheels 7 are hinged, as well as of a seat tube 8, which is hinged at one end at 9 to the frame scissors 6 and in an intermediate position at 10 to the sliding tube 4. If the sliding tube 4 in the friction bearing 5 is unlocked, as will be described in greater detail below, the frame scissors 6 can be swiveled to the left against the buggy scissors part. At the same time, the seat tube of the sliding tube 4 is shifted downwards relative to the buggy scissors part 1, so that the arrangement is shortened additionally. Armrests 11 are attached to the seat tube and the sliding tube. In addition, plastic joints 12, which can be adjusted sensitively, are also hinged to the footrests 13, the length of which can be adjusted. Buggy handles 14 are attached to the sliding tube 4. The tubular legs 15, which are inserted with a sliding fit, can be pushed into or pulled out from the sliding tube, as soon as the unlocking sleeve is actuated. At the same time, the tubular legs, which are inserted with a sliding fit, can also be rotated additionally about their longitudinal axis, so that the buggy handles 14 can be swiveled out of the vertical position shown in FIG. 1, in which the two buggy handles left and right lie in mutually parallel planes, through 90° inwards, so that they line up with one another and form, as it were, the parts of the handle of a normal baby carriage.

Figure 2:
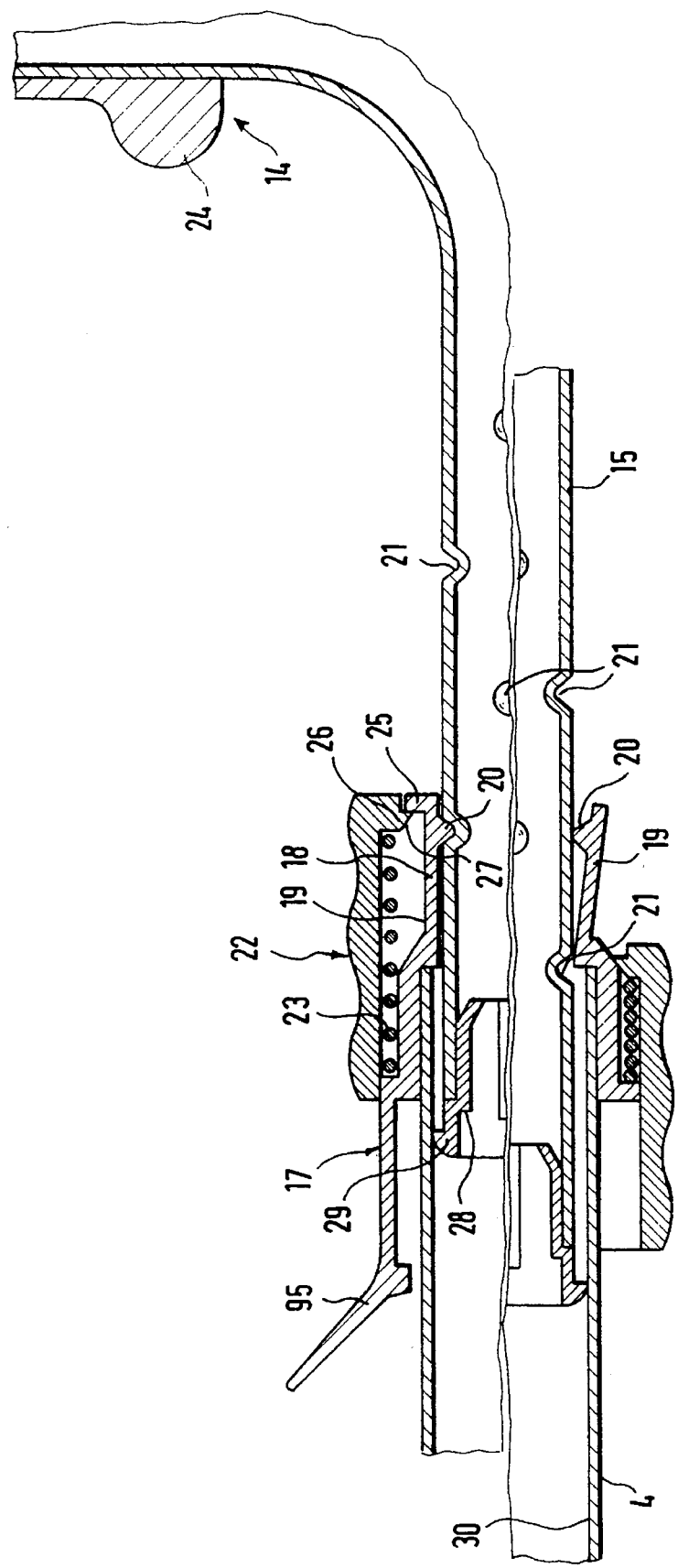
FIG. 2 shows an enlarged section through one of the sliding tubes with the buggy handle, the length of which is adjustable, is guided.

FIG. 2 shows in section the details of the construction of the telescopic adjustability of the buggy handle for adaptation to the height of the respective user, who wants to push the buggy. An inner sleeve 17 is firmly mounted on the sliding tube 4. It has a section 18, the diameter of which is less than that of the sliding tube 4. The section 18 is provided with at least one tongue 19, which is formed by a slotting and is provided with a knob 20, which optionally can engage beads 21 of the tubular leg 15, which is inserted with a sliding fit. Such beads are disposed in at least two and preferably four rows, which are mutually offset by 90°. One such row of beads makes possible a corresponding change in the length of the buggy handle relative to the slide tube 4. For this purpose, however, it is necessary, to begin with, to shift an unlocking sleeve 22, which can be shifted longitudinally on the inner sleeve 17, against the action of the spirally coiled spring 23, to the left into an unlocking position, shown at the bottom of FIG. 2, so that the tongues 19 are free and the tongue 19 is swiveled towards the outside into the unlocked position shown at the bottom of FIG. 2 by the wedge action of the beads 21 and knobs 20 when the buggy handle is pulled or pushed. If the unlocking sleeve 22 is released again, it returns into the locked position shown at the top of FIG. 2, in which the tongues 19 are prevented from swiveling towards the outside, so that the longitudinal position of the buggy handle, set with respect to the sliding tube 4, cannot be changed. Due to the arrangement of beads 21 in at least two rows mutually offset by 90°, not only is it possible to adjust the length of the buggy handle, but it is also possible to rotate this handle through 90°, so that the actual handle parts 24 can be turned from the usual vertical position parallel to one another into a horizontal, mutually aligned position. The unlocking sleeve 22 has a stop shoulder 26, which grasps behind a counter-shoulder 25 of the inner sleeve in the locked position and is provided with a forcing-in inclination 27, so that the sleeves, in order to install them, can simply be pressed over one another.

The tubular leg 15, which is inserted with a sliding fit, is not guided directly by its sliding engagement with the sliding tube 4, but is guided, on the one hand, in the region of the constricted section 18 of the inner sleeve and, on the other, over a sliding guidance stopper 28, which is inserted into the free end of the tubular leg, which is inserted with a sliding fit, and slides with an outer sliding shoulder 29 along the inner wall 30 of the sliding tube 4.

FIGS. 3 to 6 show the construction of the special friction bearing 5, in which the buggy scissors part 1 is firmly fastened with the help of a transverse bolt 31, while the frame scissors 6 are pivotably hinged by means of a bearing bolt 32 and the sliding tube 4 finally is guided longitudinally displaceably in a piercing sliding borehole 33 and can be secured by a locking device, which will be described below.

This locking device comprises an essentially L-shaped raster knob 34, the leg 35 of which forms the actual operating part, while the leg 37, which runs in a recess 36 below the sliding tube 4, is provided with an angled longitudinal groove 38 with a central locking indentation 39 for a locking knob 40, which is constructed, for example, as a blind rivet. The raster knob 34 is forced towards the outside by a spirally coiled compression spring 41 into the locking position shown in FIGS. 1 and 6. This spirally coiled compression spring 41 is supported at the end of the guide for the lower leg 37 of the raster knob 34 and at the other end in an annular groove 42 of this lower leg. If the raster knob is pressed towards the inside, that is, towards the left in FIG. 6, the locking knob 40 emerges from the locking indentation 39 and reaches the angled groove 38, so that the sliding tube 4 can be shifted longitudinally in the guide 33 of the friction bearing 5 in order to make it possible, as already described above, to carry out the collapsing motion or conversely the setting-up motion. During this setting-up motion, the locking knob 40 moves into the outer opening 43 of the longitudinal groove 38 and, upon appropriate automatic shifting of the raster knob, towards the inside, finally latching into the locking indentation 39. The construction of the angled longitudinal groove 38 is such, that the same raster knob can be used for locking the left and right sliding tubes. On each side, the one arm of the oblique groove with the connecting locking indentation 39 would be sufficient. Due to this double construction, however, there is no need for two different components left and right.

Figure 7:
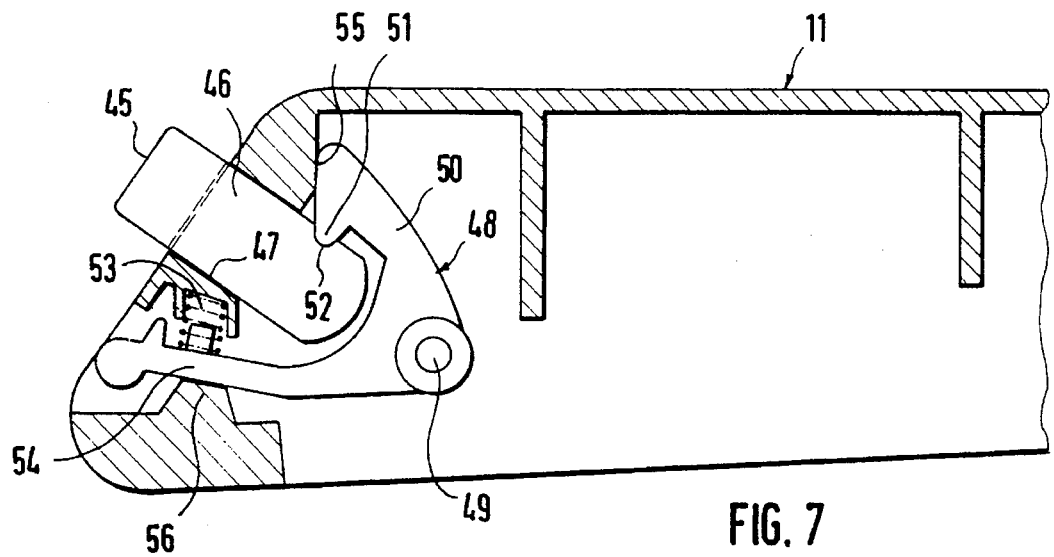
FIG. 7 shows a section through an armrest in the locked position of a play frame inserted in the front.
Figure 8:
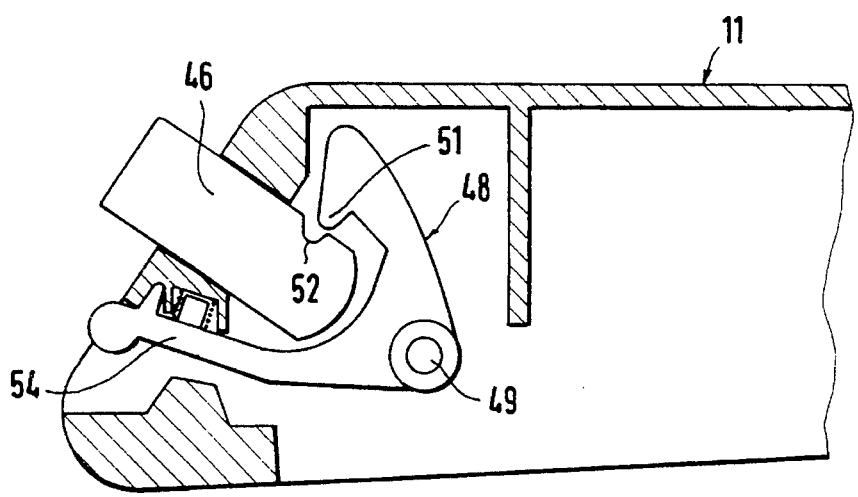
FIG. 8 shows a section corresponding to that of FIG. 7, with the locking elbow lever for the play frame swivelled into the release position.

FIGS. 7 and 8 diagrammatically show the simple possibility for locking a play frame 45 with lateral insertion pegs 46 to the armrests 11, which are constructed as injection-molded parts. At the front ends, these armrests 11 are provided with recesses 47, in which in each case one elbow lever 48 is pivotably mounted at 49. The upper arm 50 of the elbow lever is provided with a hook 51, which is pressed over a spirally coiled compression spring 53 into a locking depression 52 of the peg 46 of the play frame 45. The spirally coiled compression spring 53 acts on the lower arm 54 of the elbow lever 48, which at the same time is constructed as release lever. This lower leg 54 lies concealed in the recess. However, it can be grasped from below in order to be swiveled by hand from the locking position shown in FIG. 7 into the release position shown in FIG. 8, in which the play frame can simply be pulled out to the outside. Insertion stops can be provided either in the region of the upper leg 50 as at 55 or in the region of the lower leg 54 as at 56. These insertion stops limit the pivoting motion of the elbow lever 48 under the action of the spring 53 in the locked position, so that the locking lever cannot protrude too far into the insertion opening 47, in which it would then impede the insertion of the play frame 45. The insertion is facilitated owing to the fact that the hook 51 forms an insertion incline for the play frame.

Figure 9:
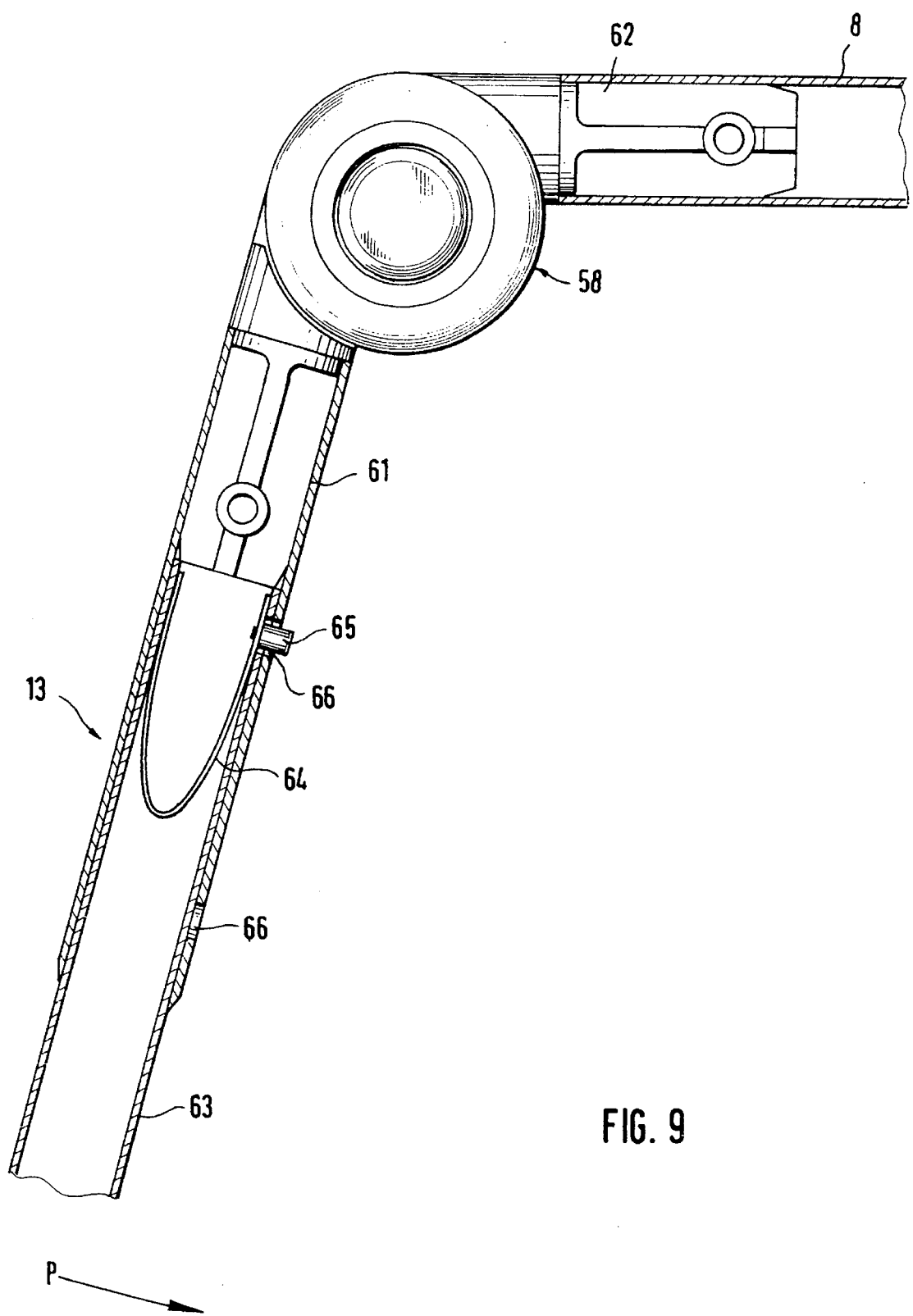
FIG. 9 shows a partially cut side view of the adjusting mechanism for the footrest.
Figure 10:
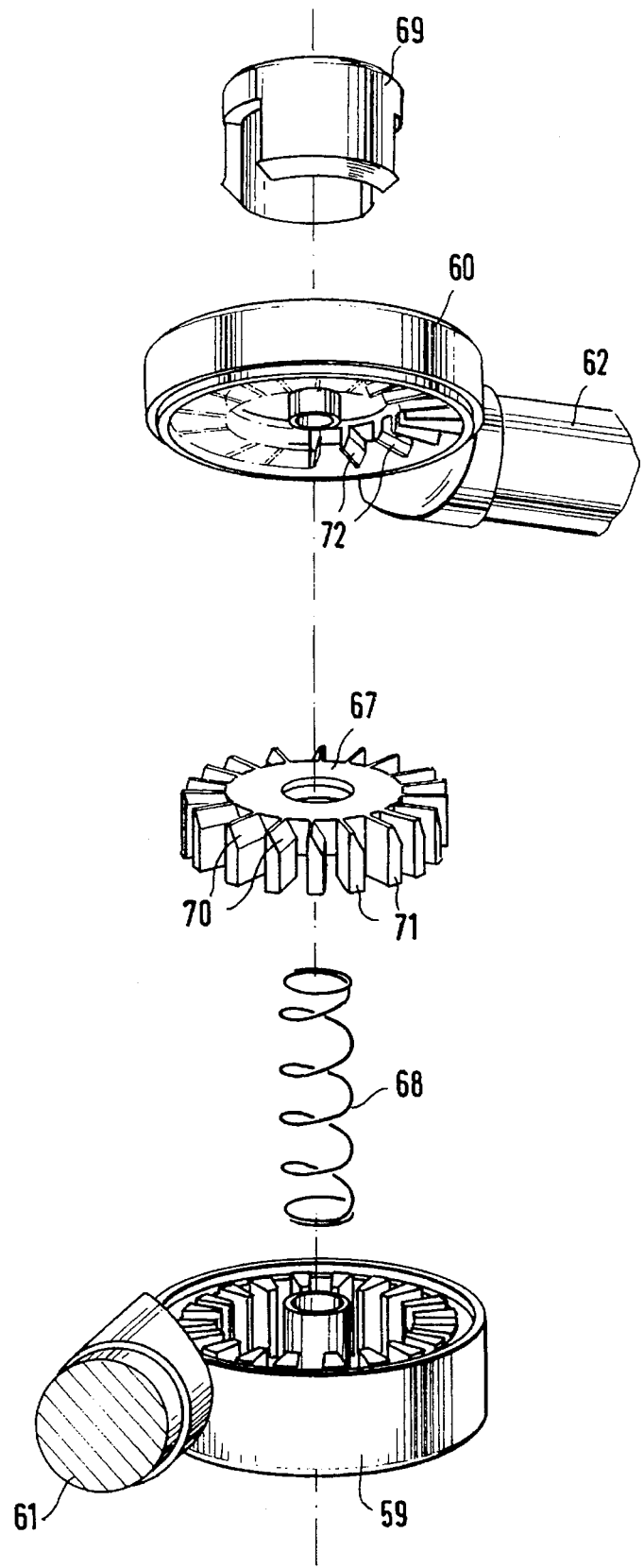
FIG. 10 shows a perspective, exploded representation of the parts of the joint of the adjusting mechanism of FIG. 9.

FIG. 9 shows a side view of a footrest 13 with a plastic joint 58 with two joint shells 59 and 60, which can be rotated relatively to one another, are held together by a common axle and in each case have a tubular attachment 61 and 62 respectively, which serves for the connection to the side legs 63 of the footrests on the one hand and to the seat tubes 8 on the other. In the case where the tubular attachment 61 is connected with the side legs 63 of the footrests, an additional possibility is provided for adjusting the length in that the tubular leg 63, forming the inner tube, is provided with a leaf spring 64 with a locking bolt 65, which optionally can engage a plurality of recesses 66 in the outer joint tube 61.

The plastic joint enables the height of the footrest to be adjusted sensitively by swivelling, so that this footrest is locked in the downwards direction in every locking step and thus forms a locked support position for the lower legs of the small child. On the other hand, in the opposite swivelling direction upwards, due to the construction described in detail below, the plastic joint has a ratchet-like free-wheeling mechanism, so that, without special precautions, the footrest is swivelled automatically, irrespectively of its initial position, into the horizontal position when the buggy is collapsed.

For this purpose, the first joint shell 59 and the second joint shell 60 are each provided with recesses for a crown gear 67, which is constantly pressed by a spiral spray 68 in lower joint shell 59 and partially into the teeth of the upper joint shell 60 and thus brings about a mutual blocking of these shells, so that the joint is fixed. By actuating the pushbutton 69, the crown gear can be pushed downwards completely into the joint shell 59 against the action of the spring 68, so that the two joint shells then can be freely rotated with respect to one another, in order to bring about a desired inclination of the joint. When the pushbutton 69 is released, the crown gear 67 once again partially penetrates into the upper joint shell 60, so that the two shells are then locked again with respect to one another. However, this locking applies only for the one swiveling direction, that is, to the swiveling direction of the arrow P in FIG. 9. The joint can always be swiveled in the opposite direction, so that the footrest can be raised upwards from the position, into which it has been swiveled downwards, into any other desired position without actuating the pushbutton 69. This results from the inclinations 70 on the teeth 71 of the crown gear 67 in conjunction with corresponding counter-inclinations 72 on the teeth forming the upper joint shell 60, which permit a ratchet-like sliding off in said direction of rotation counter to the direction of the arrow P in FIG. 9.

Figure 11:
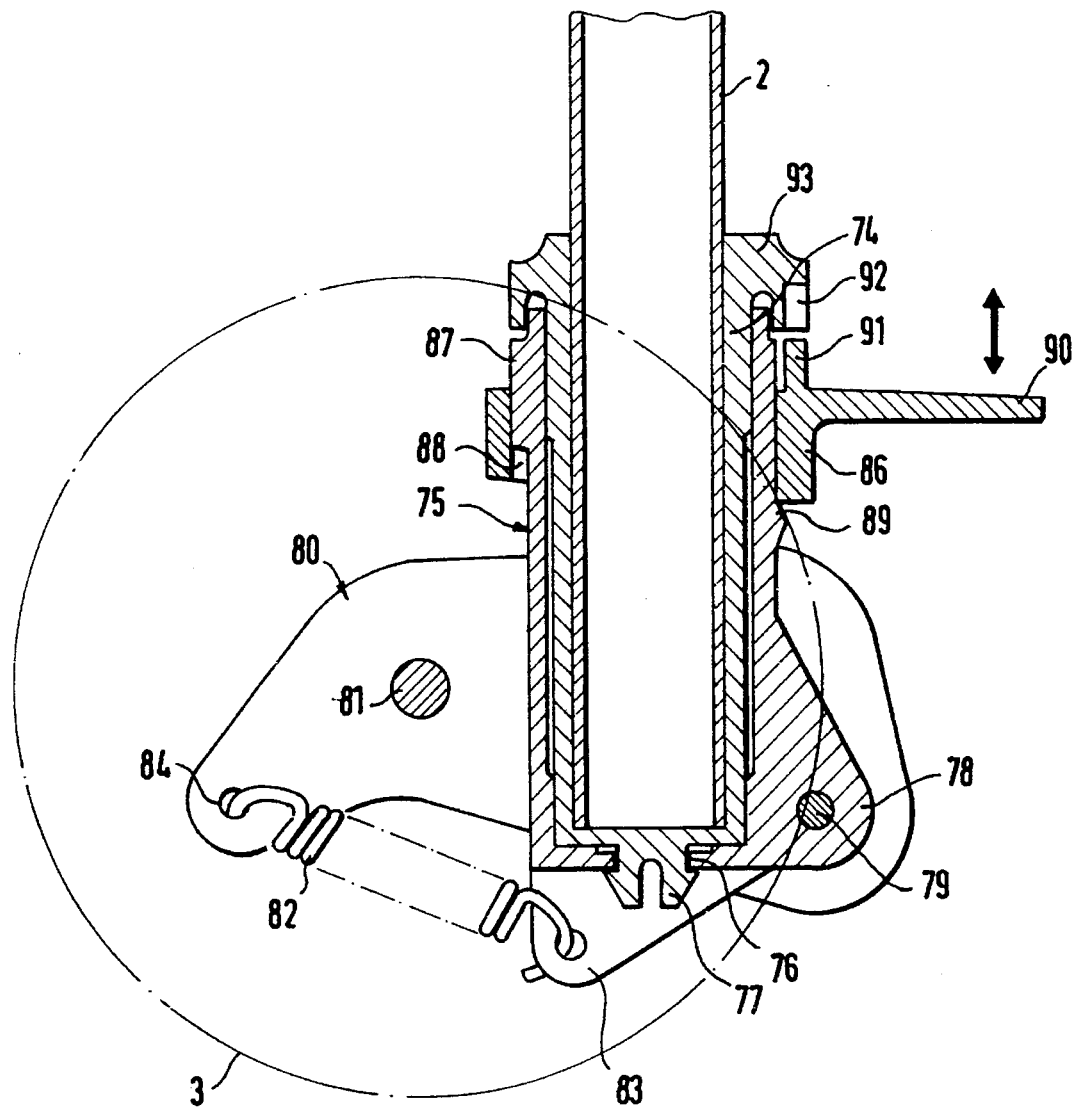
FIG. 11 shows an enlarged section through a cushioned and steerable wheel suspension.

FIG. 11 shows a cushioned and steerable wheel suspension, particularly for the front wheels 3. For this purpose, an inner bearing sleeve 74 is mounted so that it cannot be rotated or shifted on the tube 2. An outer bearing sleeve 75 can be rotated about the inner bearing sleeve 74. The outer bearing sleeve 75 is held to the inner bearing sleeve 74 by means of a bolt 77 of the inner bearing sleeve 74, which bolt 77 can be forced into a recess 76 in the bottom of the outer bearing sleeve 75. The outer bearing sleeve 75 has a first prolongation 78, at which the bearing box 80 is suspended at one end with its longitudinal axle 81 over a bearing bolt 79 for the front wheels 3, which preferably are constructed as tandem wheels. The bearing box 80 is braced by a tension spring 82 between a further prolongation 83 of the outer bearing sleeve 75 and a point of engagement 84, which is offset in height relative to the wheel axle 81. As a result, in conjunction with the large offsetting of the wheel axle 81 relative to the pivoting point 79, a pivoting motion of the bearing box 80 and, with that, a cushioned evasion of the wheels takes place already when the wheel 3 collides with an obstacle. In any case, this type of coupling offers a particularly large spring excursion. At 86, a locking ring can be seen which, with the help of a spring pin 87 of the outer bearing sleeve 75 and an inner groove 88 accommodating this spring pin 87 is seated on the outer bearing sleeve 75 so that it can be shifted longitudinally but cannot be rotated. At the same time, it is prevented by a stop 89 from sliding down into the region of the bearing box 80. The locking ring 86 is provided with an actuating arm 90 and an extension 91, which can be pushed into and jammed in a recess 92 of a collar 93 of the inner bearing sleeve in order to prevent in this way the ability of the wheel suspension to rotate about the axis of the tube 2 and, with that, to bring about a locking of the wheels.

I claim:

1. A collapsible buggy comprising a sliding tube with a buggy handle, an elongated buggy scissor part parallel to said sliding tube, a frame scissor part, support means connected to said buggy scissor part, pivot means pivotably mounting said frame scissor part on said support means to thereby provide for relative pivotal movement between said buggy scissor part and said frame scissor part, said support means slidably supporting said sliding tube, a seating means comprising an elongated seating tube pivotally connected to said frame scissor part and to said sliding tube, said seating means further comprising an arm rest means pivotably connected to said sliding tube and to said seating tube, and adjustable mounting means for adjustably mounting said handle on said sliding tube, said adjustable mounting means comprising telescopically disposed longitudinal end sections on said sliding tube and on said handle which provide for relative longitudinal slidable movement between said sliding tube and said handle and for relative rotary movement between said sliding tube and said handle, said adjustable mounting means further comprising locking means on said sliding tube and on said handle for locking said handle in a desired fixed longitudinal position on said sliding tube and for locking said handle in a desired fixed rotated position on said sliding tube, each of said handles having a grip part generally perpendicular to said telescopically disposed longitudinal end section on said handle, each of said grip parts having a longitudinal axis, said handles having a rotated position in which each of said grip parts extends inwardly of the buggy towards the other grip part and in which the longitudinal axes of said grip parts are aligned with one another.

2. A collapsible buggy according to claim 1 wherein said telescopically disposed longitudinal end section on said handle has a plurality of spaced locking receiving means, said adjustable mounting means comprising an inner sleeve fixed to said telescopically disposed longitudinal end section of said sliding tube, said sleeve having an extended inner sleeve portion disposed about said telescopically disposed longitudinal end section on said handle, said extended inner sleeve portion having locking projections receivable in said locking receiving means in said telescopically disposed longitudinal end section on said handle to lock said handle in the desired adjusted position, said plurality of spaced locking receiving means being spaced ninety degrees apart on said handle end section, said locking projections being spaced ninety degrees apart on said extended inner sleeve portion, said adjustable mounting means further comprising an outer sleeve disposed about said inner sleeve said outer sleeve being longitudinally slidable on said inner sleeve to a locking position in which the outer sleeve prevents said locking projections from coming out of said locking receiving means and an unlocking position in which said projections are free to come out of said locking receiving means, said adjustable mounting means further comprising biasing means biasing said outer sleeve toward said locking position.

3. A collapsible buggy according to claim 2 wherein said outer sleeve has a stop-shoulder, said inner sleeve having a counter-shoulder which is engaged by said stop shoulder when said outer sleeve is in said locking position.

4. A collapsible buggy according to claims 3 wherein one of said shoulders has a frusto-conical surface which is adapted to engage the other shoulder to facilitate assembly of said outer sleeve on said inner sleeve such that the diameter of said one shoulder temporarily increases as said frusto-conical surface of said one shoulder slides over said other shoulder to an assembled position.

5. A collapsible buggy according to claim 2 wherein said telescopically disposed longitudinal end section of said sliding tube has an internal diameter, said telescopically disposed longitudinal end section on said handle having an external diameter greater than said internal diameter of said telescopically disposed longitudinal end section of said sliding tube such as to provide an annular space between said telescopically disposed longitudinal end section of said sliding tube and said telescopically disposed longitudinal end section on said handle, said extended sleeve portion of said sleeve having an inner diameter substantially equal to the outer diameter of said telescopically disposed longitudinal end section on said handle such that said extended sleeve portion slidably and rotatably receives said telescopically disposed longitudinal end section on said handle.

6. A collapsible buggy according to claim 5 wherein said handle end section has a terminating end, a guide stopper disposed on said terminating end of said handle end section, said guide stopper having an outer diameter substantially equal to said inner diameter of said sliding tube end section such that said sliding tube end section slidably and rotatably receives said handle end section.

7. A collapsible buggy according to claim 1 wherein said support means comprises a support structure having a slide passage for slidably supporting said sliding tube, said support structure having a recess communicating with said slide passage, a knob in said recess, said knob being movable between a lock position and a release position, biasing means biasing said knob towards said lock position, said knob having a groove and an indentation leading off of said groove, a projection projecting from said sliding tube, said knob when in said lock position being operable to position said indentation to receive said projection to thereby prevent sliding movement of said sliding tube in said slide passage, said knob being manually moveable from said lock position to said release position against the bias of said biasing means to thereby position said indentation out of engagement with said projection to enable said sliding tube to slide in said sliding passage.

8. A collapsible buggy according to claim 7 wherein said sliding tube has a longitudinal axis, said groove extending at an acute angle relative to said longitudinal axis.

9. A collapsible buggy according to claim 8 wherein said knob has an L-shaped configuration having two legs, one of said legs having a groove, said biasing means comprising a coil spring received in said groove.

10. A collapsible buggy according to claim 7 wherein said support structure has a generally inverted tear-drop configuration with an upper part which is wider than a lower part, said sliding passage being disposed in said upper part, said pivot means for pivotably supporting said frame scissor part being disposed in said lower part.

11. A collapsible buggy according to claim 7 wherein said support structure has an intermediate part between said upper part and said lower part, said connecting means fixedly connecting said buggy scissor part to said intermediate part of said support structure.

12. A collapsible buggy according to claim 1 further comprising footrest means having footrest side legs, and tilt adjustment means disposed on said footrest side legs and on said seating tube for adjusting the angular tilt position of said footrest side legs relative to said seating tube said tilt adjustment means comprising a first annular joint shell connected to said seating tube, a second annular joint shell connected to said footrest side leg, said first annular joint shell having a plurality of first shell teeth disposed about a first axis, said second annular joint shell having a plurality of second shell teeth disposed about a second axis which is aligned with said first axis, an intermediate gear having a plurality of intermediate gear teeth disposed about an intermediate gear axis aligned with said first and second axes, said intermediate gear being axially slidable to locking position in which said intermediate gear teeth engages said first and second shell teeth to preclude relative rotation between said first and second annular joint shells, said intermediate gear being axially slidable from said locking position to a release position in which said intermediate gear teeth are released from engagement with said shell teeth of one of said first and second joint shells to thereby permit relative rotation between said first and second joint shells, biasing means biasing, said intermediate gear to said locking position, and manually operated pushbutton means operable to move said intermediate gear from said locked to said release position against the bias of said biasing means, said first and second plurality of shell teeth having inclined teeth surfaces, said intermediate gear teeth having sloped surfaces which are juxtaposed to said inclined teeth surfaces such that rotation of said first and second plurality of shell teeth in one rotary direction causes said inclined teeth surfaces of said first and second plurality of shell teeth to engage said sloped surfaces on said intermediate gear to effect axial movement of said intermediate gear against the bias of said biasing means from said locked position to a said release position in which said first and second plurality of shell teeth, are thereby permitted to rotate in one rotary direction, said intermediate gear teeth and said first and second plurality of shell teeth preventing axial movement of said intermediate gear from said locking position to said release position when said first and second plurality of shell teeth are rotated in a direction opposite to said one rotary direction.

13. A collapsible buggy according to claim 1 wherein said buggy scissor part has a vertical tube section, an outer bearing sleeve rotatably disposed about said vertical tube section, a bearing box structure, a buggy wheel rotatably supported on said bearing box structure, said buggy wheel having an axis of rotation, pivot means pivotably supporting said bearing box structure on said outer bearing sleeve for pivotal movement about a pivotal axis parallel to said axis of rotation, biasing means between said bearing box structure and said outer bearing sleeve biasing said bearing box structure in one pivotal direction about said pivotal axis, said biasing means being connected to said bearing box structure at a connection which is disposed at an elevation lower than the elevation of the axis of rotation of said buggy wheel, said biasing means comprises a coil spring having a longitudinal axis disposed at an acute angle relative to horizontal, and an inner sleeve bearing fixed to said vertical tube section said inner tube bearing being rotatably received in said outer sleeve bearing, said inner tube bearing having a collar having a locking recess, and a locking ring disposed about said outer sleeve bearing, said locking ring being axially slidably and non-rotatably mounted on said outer sleeve bearing, said locking ring being axially slidable to a locking position in which said locking ring engages said locking recess on said collar to thereby prevent relative rotation between said inner and outer sleeve bearings, said locking ring being axially slidable from said locking position to a release position in which said locking ring is released from said locking recess in said collar and said inner sleeve bearing is thereby free to rotate relative to said outer sleeve bearing.

14. A collapsible buggy comprising a sliding tube with a buggy handle, an elongated buggy scissor part parallel to said sliding tube, a frame scissor part, support means connected to said buggy scissor part, pivot means pivotably mounting said frame scissor part on said support means to thereby provide for relative pivotal movement between said buggy scissor part and said frame scissor part, said support means slidably supporting said sliding tube, a seating means comprising an elongated seating tube pivotally connected to said frame scissor part and to said sliding tube, said seating means further comprising an arm rest means pivotally connected to said sliding tube and to said seating tube, a foot rest means pivotably connected to said seating tube, and adjustable mounting means for adjustably mounting said handle on said sliding tube, said adjustable mounting means comprising telescopically disposed longitudinal end sections on said sliding tube and on said handle which provide for relative longitudinal slidable movement between said sliding tube and said handle, said adjustable mounting means further comprising locking means on said sliding tube and on said handle for locking said handle in a desired fixed longitudinal position on said sliding tube, said telescopically disposed longitudinal end section on said handle having a plurality of spaced locking receiving means, said adjustable mounting means comprising an inner sleeve fixed to said telescopically disposed longitudinal end section on said sliding tube, said sleeve having an extended inner sleeve portion disposed about said telescopically disposed longitudinal end section on said handle, said extended inner sleeve portion having locking projections receivable in said locking receiving means in said telescopically disposed longitudinal end section on said handle to lock said handle in the desired adjusted position, said adjustable mounting means further comprising an outer sleeve disposed about said inner sleeve, said outer sleeve being longitudinally slidable on said inner sleeve to a locking position in which the outer sleeve prevents said locking projections from coming out of said locking receiving means and an unlocking position in which said projections are free to come out of said locking receiving means, said adjustable mounting means further comprising biasing means biasing said outer sleeve toward said locking position, said outer sleeve having a stop-shoulder, said inner sleeve having a counter-shoulder which is engaged by said stop shoulder when said outer sleeve is in said locking position.

15. A collapsible buggy comprising a sliding tube with a buggy handle, an elongated buggy scissor part parallel to said sliding tube, a frame scissor part, support means connected to said buggy scissor part, pivot means pivotably mounting said frame scissor part on said support means to thereby provide for relative pivotal movement between said buggy scissor part and said frame scissor part, said support means slidably supporting said sliding tube, a seating means comprising an elongated seating tube pivotally connected to said frame scissor part and to said sliding tube, said seating means further comprising an arm rest means pivotably connected to said sliding tube and to said seating tube, a foot rest means pivotably connected to said seating tube, and adjustable mounting means for adjustably mounting said handle on said sliding tube, said adjustable mounting means comprising telescopically disposed longitudinal end sections on said sliding tube and on said handle which provide for relative longitudinal slidable movement between said sliding tube and said handle, said adjustable mounting means further comprising locking means on said sliding tube and on said handle for locking said handle in a desired fixed longitudinal position on said sliding tube, said telescopically disposed longitudinal end section on said handle having a plurality of spaced locking receiving means, said adjustable mounting means comprising an inner sleeve fixed to said telescopically disposed longitudinal end section on said sliding tube, said sleeve having an extended inner sleeve portion disposed about said telescopically disposed longitudinal end section on said handle, said extended inner sleeve portion having locking projections receivable in said locking receiving means in said telescopically disposed longitudinal end section on said handle to lock said handle in the desired adjusted position, said telescopically disposed longitudinal end section on said sliding tube having an internal diameter, said telescopically disposed longitudinal end section on said handle having an external diameter greater than said internal diameter of said telescopically disposed longitudinal end section on said sliding tube such as to provide an annular space between said telescopically disposed longitudinal end section on said sliding tube and said telescopically disposed longitudinal end section on said handle, said extended sleeve portion of said sleeve having an inner diameter substantially equal to the outer diameter of said telescopically disposed longitudinal end section on said handle such that said extended sleeve portion slidably and rotatably receives said telescopically disposed longitudinal end section on said handle.

16. A collapsible buggy comprising a sliding tube with buggy handle, an elongated buggy scissor part parallel to said sliding tube, a frame scissor part, support means connected to said buggy scissor part, pivot means pivotably mounting said frame scissor part on said support means to thereby provide for relative pivotal movement between said buggy scissor part and said frame scissor part, said support means slidably supporting said sliding tube, a seating means comprising an elongated seating tube pivotally connected to said frame scissor part and to said sliding tube, said seating means further comprising an arm rest means pivotably connected to said sliding tube and to said seating tube, a foot rest means pivotably connected to said seating tube, and adjustable mounting means for adjustably mounting said handle on said sliding tube, said adjustable mounting means comprising telescopically disposed longitudinal end sections on said sliding tube and on said handle which provide for relative longitudinal slidable movement between said sliding tube and said handle, said adjustable mounting means further comprising locking means on said sliding tube and on said handle for locking said handle in a desired fixed longitudinal position on said sliding tube, said support means comprising a support structure having a slide passage for slidably supporting said sliding tube, said support structure having a recess communicating with said slide passage, a knob in said recess, said knob being movable between a lock position and a release position, biasing means biasing said knob towards said lock position, said knob having a groove and an indentation leading off of said groove, a projection projecting from said sliding tube, said knob when in said lock position being operable to position said indentation to receive said projection to thereby prevent sliding movement of said sliding tube in said slide passage, said knob being manually moveable from said lock position to said release position against the bias of said biasing means to thereby position said indentation out of engagement with said projection to enable said sliding tube to slide in said sliding passage.

17. A collapsible buggy comprising a sliding tube with a buggy handle, an elongated buggy scissor part parallel to said sliding tube, a frame scissor part, support means connected to said buggy scissor part, pivot means pivotally mounting said frame scissor part on said support means to thereby provide for relative pivotal movement between said buggy scissor part and said frame scissor part, said support means slidably supporting said sliding tube, a seating means comprising an elongated seating tube pivotally connected to said frame scissor part and to said sliding tube, said seating means further comprising an arm rest means pivotably connected to said sliding tube and to said seating tube, a foot rest means pivotally connected to said seating tube, and adjustable mounting means for adjustably mounting said handle on said sliding tube, said adjustable mounting means comprising telescopically disposed longitudinal end sections on said sliding tube and on said handle which provide for relative longitudinal slidable movement between said sliding tube and said handle, said adjustable mounting means further comprising locking means on said sliding tube and on said handle for locking said handle in a desired fixed longitudinal position on said sliding tube, said arm rest means comprising an arm rest member having a front recess and support means for supporting a play frame in said front recess, said support means being operable to permit said play frame to be readily removed from said front recess, said support means comprising an elbow lever pivotally mounted on said arm rest member, said elbow lever having an upper leg and a lower leg, said play frame being disposed in said front recess and having an inner end with a locking depression, said upper leg of said elbow lever having a hook, said elbow lever being pivotable between a locking position and a release position, said hook on said upper leg of said elbow lever engaging said locking depression on said play frame when said locking lever is in said locking position, said hook on said upper leg of said elbow lever being disengaged from said locking depression on said play frame when said locking lever is in said release position, and biasing means engaging said lower leg of said elbow lever for biasing said elbow lever toward said locking position.

18. A collapsible buggy comprising a sliding tube with a buggy handle, an elongated buggy scissor part parallel to said sliding tube, a frame scissor part, support means connected to said buggy scissor part, pivot means pivotally mounting said frame scissor part on said support means to thereby provide for relative pivotal movement between said buggy scissor part and said frame scissor part, said support means slidably supporting said sliding tube, a seating means comprising an elongated seating tube pivotally connected to said frame scissor part and to said sliding tube, said seating means, further comprising an arm rest means pivotably connected to said sliding tube and to said seating tube, a foot rest means pivotally connected to said seating tube, and adjustable mounting means for adjustably mounting said handle on said sliding tube, said adjustable mounting means comprising telescopically disposed longitudinal end sections on said sliding tube and on said handle which provide for relative longitudinal slidable movement between said sliding tube and said handle, said adjustable mounting means further comprising locking means on said sliding tube and on said handle for locking said handle in a desired fixed longitudinal position on said sliding tube, said footrest means comprising footrest side legs, and tilt adjustment means disposed on said footrest side legs and on said seating tube for adjusting the angular tilt position of said footrest side legs relative to said seating tube, said tilt adjustment means comprising a first annular joint shell connected to said seating tube, a second annular joint shell connected to said footrest side leg, said first annular joint shell having a plurality of first shell teeth disposed about a first axis, said second annular joint shell having a plurality of second shell teeth disposed about a second axis which is aligned with said first axis, an intermediate gear having a plurality of intermediate gear teeth disposed about an intermediate gear axis aligned with said first and second axes, said intermediate gear being axially slidable to a locking position in which said intermediate gear teeth engage said first and second shell teeth to preclude relative rotation between said first and second annular joint shells, said intermediate gear being axially slidable from said locking position to a release position in which said intermediate gear teeth are released from engagement with said shell teeth of one of said first and second joint shells to thereby permit relative rotation between said first and second joint shells, biasing means biasing said intermediate gear to said locking position, and manually operated pushbutton means operable to move said intermediate gear from said locked to said released position against the bias of said biasing means.

19. A collapsible buggy comprising a sliding tube with a buggy handle, an elongated buggy scissor part parallel to said sliding tube, a frame scissor part, support means connected to said buggy scissor part, pivot means pivotally mounting said frame scissor part on said support means to thereby provide for relative pivotal movement between said buggy scissor part and said frame scissor part, said support means slidably supporting said sliding tube, a seating means comprising an elongated seating tube pivotally connected to said frame scissor part and to said sliding tube, said seating means further comprising an arm rest means pivotably connected to said sliding tube and to said seating tube, a foot rest means pivotally connected to said seating tube, and adjustable mounting means for adjustably mounting said handle on said sliding tube, said adjustable mounting means comprising telescopically disposed longitudinal end sections on said sliding tube and on said handle which provide for relative longitudinal slidable movement between said sliding tube and said handle, said adjustable mounting means further comprising locking means on said sliding tube and on said handle for locking said handle in a desired fixed longitudinal position on said sliding tube, said buggy scissor part having a vertical tube section, an outer bearing sleeve rotatably disposed about said vertical tube section, a bearing box structure, a buggy wheel rotatably supported on said bearing box structure, said buggy wheel having an axis of rotation, pivot means pivotably supporting said bearing box structure on said outer bearing sleeve for pivotal movement about a pivotal axis parallel to said axis of rotation, and biasing means between said bearing box structure and said outer bearing sleeve biasing said bearing box structure in one pivotal direction about said pivotal axis, an inner sleeve bearing fixed to said vertical tube section, said inner tube bearing being rotatably received in said outer sleeve bearing, said inner tube bearing having a collar having a locking recess, and a locking ring disposed about said outer sleeve bearing, said locking ring being axially slidably and non-rotatably mounted on said outer sleeve bearing, said locking ring being axially slidable to a locking position in which said locking ring engages said locking recess on said collar to thereby prevent relative rotation between said inner and outer sleeve bearings, said locking ring being axially slidable from said locking position to a release position in which said locking ring is released from said locking recess in said collar and said inner sleeve bearing is thereby free to rotate relative to said outer sleeve bearing.

* * * * *